United States Patent [19]
Tseung et al.

[11] 4,300,987
[45] Nov. 17, 1981

[54] GAS EXTRACTION

[76] Inventors: Alfred C. C. Tseung; Sameer M. Jasem, both of London, England

[21] Appl. No.: 137,114

[22] PCT Filed: Apr. 11, 1979

[86] PCT No.: PCT/GB79/00060
§ 371 Date: Dec. 14, 1979
§ 102(e) Date: Nov. 5, 1979

[87] PCT Pub. No.: WO79/00933
PCT Pub. Date: Nov. 15, 1979

[30] Foreign Application Priority Data
Apr. 14, 1978 [GB] United Kingdom ............... 14752/78

[51] Int. Cl.$^3$ .................... C25B 1/00; C25B 1/06; C25B 1/10; C01B 13/00
[52] U.S. Cl. .................................. 204/129; 204/128; 204/265; 204/266; 204/277; 204/278
[58] Field of Search ................. 204/128, 129; 423/579

[56] References Cited
U.S. PATENT DOCUMENTS
2,390,591 12/1945 James ................................. 204/129
4,061,554 12/1977 Chillier-Duchatel ............... 204/129
4,132,619 1/1979 Klein et al. ...................... 204/290 R OTHER PUBLICATIONS
*Electrochimica Acta*, 1976, vol. 21, p. 567 "Oxygen Reduction on Ultra Thin Carbon", by Appelby and Savy.
*Electro-Analytical Chemistry and Interfacial Electrochemistry*, 42 (1973) 347, Taylor and Humffray, "Electro-Chemical Studies on Glassy Carbon Electrodes".

Primary Examiner—Howard S. Williams
Attorney, Agent, or Firm—Lyon & Lyon

[57] ABSTRACT

An electrochemical cell used to separate gas from a gaseous mixture by reduction of said gas at the cathode and regeneration of said gas at the anode is characterized in that one or more substances formed during the cathodic reduction and/or the anodic regeneration is chemically converted, preferably by catalytic decomposition, to produce further quantities of said gas, the gas formed by both the anodic regeneration and the chemical conversion being recovered as the product. In an especially preferred embodiment a plurality of said cells are used in apparatus for extracting oxygen from the air by using a cathode comprising high surface area graphite powder which reduces oxygen to produce peroxyl ions, each cell being further provided, externally of the cathode compartment, with means for catalytically decomposing the peroxyl ions produced, suitable catalysts being $CoFe_2O_4$ or $NiCo_2O_4$.

18 Claims, 1 Drawing Figure

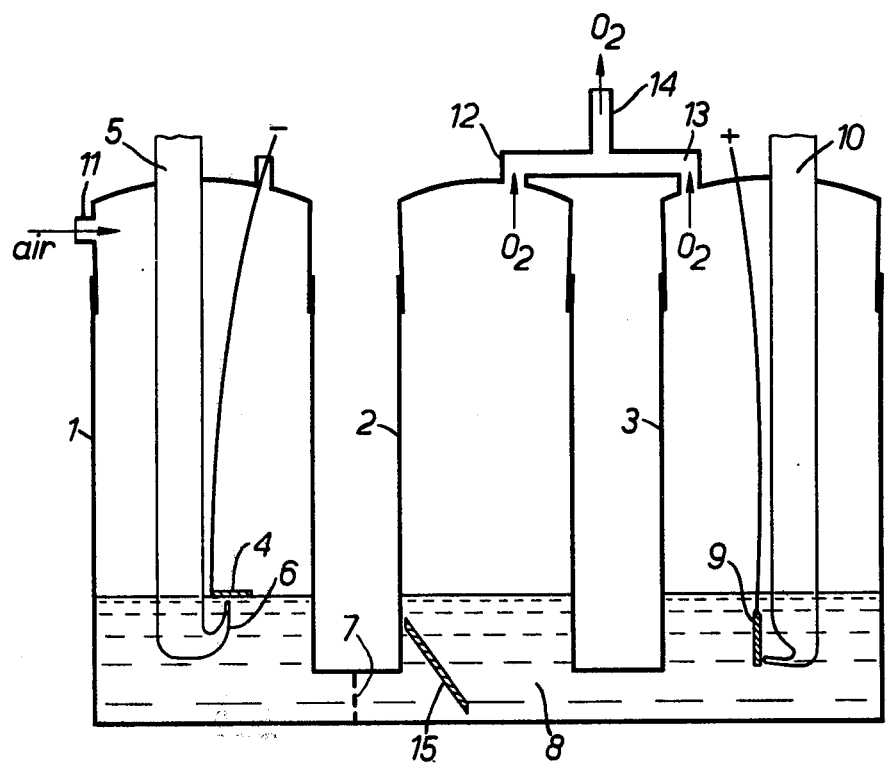

GAS EXTRACTION

This invention relates to the extraction of gases from gaseous mixtures and, more especially, to the extraction of oxygen from ambient air.

Portable oxygen providing equipment is finding increasing applications in military field hospitals, in the village clinics of developing countries, in oxy-acetylene welding and in high altitude fighter aircraft. Besides oxygen cylinders, such equipment comprises two basic types of oxygen generator; (a) chemical generators, and (b) electrochemical generators, which either electrolyse water or else extract oxygen from the air by using an oxygen reduction cathode coupled to an oxygen evolution anode.

Chemical generators employ expensive chemicals and, to date, the most common method used to generate oxygen has been the electrolysis of water. However, the high overvoltage at the anode necessitates an operating voltage of about 2.2 volts at 100 mA/cm$^2$ and the production of hydrogen as a by-product, apart from increasing the power consumption, is a potential hazard. Quite recently, therefore, there has been developed a more efficient electrochemical method in which a polytetrafluoroethylene (PTFE) bonded platinum black cathode is used to reduce oxygen in the ambient air to form hydroxyl ions in accordance with the following equation:

$$O_2 + 2H_2O + 4e \rightarrow 4OH^-$$

The hydroxyl ions diffuse through a suitable membrane, for example, a woven asbestos or glass fibre mat, to an oxygen evolution anode, usually a platinum electrode. The working voltage of this cell, taking into account the unavoidable heat losses, is about 1.3 to 1.4 volts at 100 mA/cm$^2$, which is significantly lower than the corresponding value for an electrolysis cell. However, the capital and running costs involved are still relatively high and the use of this type of oxygen extractor has been limited to specialised applications.

The present invention is based on our surprising observation that the efficiency of such electrochemical gas extraction and regeneration methods can be improved significantly in certain applications by employing an additional chemical step in which one or more substances formed in the electrochemical reaction is itself converted to the desired gaseous product, preferably by catalytic decomposition.

Accordingly, the present invention provides a method in which an electrochemical cell is used to separate a gas from a gaseous mixture by reduction of said gas at the cathode and regeneration of said gas at the anode, characterised in that one or more substances formed in the cathodic reduction and/or the anodic regeneration is chemically converted to produce said gas and in that the gas formed by both the anodic regeneration and the chemical conversion is recovered as the product. The present invention also provides apparatus for carrying out such a method.

In its broad aspect the present invention may be applied to the extraction of any gas from a gaseous mixture, provided that said gas may selectively be cathodically reduced and anodically regenerated by electrochemical reactions which produce a substance which can be chemically converted to said gas, preferably by catalytic decomposition. However, it will be appreciated from the foregoing remarks that the invention is especially applicable to the extraction of oxygen from ambient air and, for convenience, it will now be described in more detail with reference to such an application.

It is known that the reduction of oxygen on certain electrodes, especially graphite and carbon, is a two electron process obeying the equation $$O_2 + H_2O + 2e \rightarrow HO_2^- + OH^-$$

This means that when such electrodes are used in a fuel cell, they are not so efficient as electrodes which directly reduce oxygen to hydroxyl ions via a four electron process. It has, therefore, been proposed to add peroxide-decomposition catalysts to a carbon cathode in a fuel cell so that the peroxyl ion is decomposed to yield oxygen for recycling, thus leading to a higher efficiency. In accordance with the present invention; however, the catalytic decomposition of the peroxyl ion is used in an oxygen generator to provide an additional supply of oxygen as product.

In an especially preferred form of the present invention, therefore, there is provided an oxygen extraction apparatus comprising at least one cell which is provided with a cathode for the reduction of oxygen by an electrochemical reaction which produces peroxyl ions and an anode which will regenerate oxygen characterised in that said cell is further provided, externally of the cathode compartment, with means for the catalytic decomposition of hydrogen peroxyl ions.

It will be appreciated that such apparatus will also be provided with means for the supply of ambient air at a suitable rate and also with means for collecting the oxygen produced by the electrochemical and chemical reactions. In practice the apparatus will typically comprise a plurality of such cells, for example from 10 to 20, and may advantageously be built to a modular design for ease of replacement and repair of the cells. It will, in any case, be appreciated that the design of the apparatus will depend upon the particular application and, especially, upon the desired rate of production of oxygen.

Suitable physical constructions for the cell will be apparent to those conversant with fuel cell technology. For example it will, in general, be appropriate to provide means such as a porous screen made, for example, from asbestos or glass to separate the cathode compartment from the remainder of the cell in order to prevent back diffusion of oxygen bubbles to the cathode compartment and to prevent diffusion of air bubbles into the product stream. If the cell is compact in nature it may be necessary to provide means such, for example, as a net made from a plastics or other insulating material, to ensure that there is no electrical contact between the anode and the catalytic means.

Other constructional features which may prove advantageous or necessary in certain applications include means for removing carbon dioxide, means for removing electrolyte, e.g. potassium hydroxide, entrained in the oxygen product stream and means for controlling the oxygen content of the final outlet gas by admixture of the oxygen product stream with exhaust gas from the cathode compartment; this is essential in some medical applications. It will, in addition, in general be necessary to provide adequate means for controlling the voltage, current density, temperature and operating pressure of the cell and for monitoring the overall heat and means balance of the apparatus.

In this preferred application of the present invention it is necessary for the cathode to reduce oxygen by an electrochemical route which produces peroxyl ions, usually together with hydroxyl ions (generally via the two electron process described above or a near stoichiometric variation thereof) but which is made from a material which does not possess significant peroxide decomposition activity. For example, cathode materials such as fuel cell grade platinum black produce peroxyl ions but, because they have a relatively high peroxide decomposition activity, will not, in general, be suitable for use in the present invention because the peroxide ion will be decomposed in the cathode compartment and the oxygen so produced cannot be collected with the oxygen produced at the anode.

In general it is preferred to use a high surface area graphite powder which has been found to possess a very high activity for oxygen reduction in alkaline solution. A suitable graphite powder having a surface area in the range of 500 to 600 $m^2/g$ may be prepared by vacuum grinding of graphite in a vibrating ball mill; the cathode may be prepared from the graphite powder by bonding with PTFE. However, it will be appreciated that other materials may be suitable for the cathode in certain applications.

The main criterion for the oxygen evolution anode is that it should operate at a low oxygen overvoltage. Thus certain anodes such as PTFE-bonded platinum black and nickel screens will not, in general, be suitable for use in the present invention. However, amongst suitable materials there may be mentioned, for example, PTFE-bonded lithiated nickel oxide and, especially, PTFE-bonded nickel cobalt oxide ($NiCo_2O_4$) which has a lower redox potential than a platinum black anode.

Both the cathode and anode may, in some cases, advantageously be formed by depositing the active materials on a suitable support, such as a nickel screen.

The electrolyte itself is advantageously an aqueous solution of an alkali metal hydroxide, e.g. sodium hydroxide, or especially, potassium hydroxide, but it will be appreciated that other electrolytes may be useful in certain applications.

The essence of this preferred application of the present invention is to provide means for catalytically decomposing hydrogen peroxide (or, more correctly, the peroxyl ion which it forms in the electrolyte) to produce an additional supply of oxygen for collection in the anode compartment. In this way, the effective current required for the oxygen extraction process is halved leading to a significant reduction in power consumption. In certain instances it may be appropriate to provide such means as a chemical substance in solution or dispersion in the electrolyte, but, in general, it will be preferred to provide the catalyst in the form of a solid member or, more especially, absorbed or coated on a suitable solid support. Amongst suitable material there may be mentioned, for example, certain spinel oxides and silver which may be coated or absorbed on a graphite or carbon support. Preferred peroxide decomposition catalysts are $CoFe_2O_4$ and, especially, $NiCo_2O_4$. These materials may be brought into suitable form by bonding with PTFE, but, in general, it will be preferred to coat them on a suitable porous or perforated support, e.g. a nickel screen. It has been found that their activity is considerably greater in the latter form because the catalytic reaction can more easily occur on the surface of the screen and because, in addition, the available surface of the screen is entirely composed of the catalyst whereas about 50% of a PTFE-bonded member is composed of PTFE particles where no catalytic reaction can occur.

Both $CoFe_2O_4$ and $NiCo_2O_4$ are relatively cheap materials which can be produced in particulate form by freeze-drying methods or by thermal decomposition or double precipitation methods.

In summary, it may be stated that the electrochemical/chemical method of oxygen extraction according to the present invention provides significant advantages in cost reduction and in other respects as compared with the conventional electrochemical oxygen extractors at present available. At operating voltages of around 1 volt and at an operating temperature of 40° C. with 5N KOH as the electrolyte the approximate power consumption of a cell constructed in accordance with the present invention is only about 2.7 to 3 kilowatt hours per 1,000 liters of oxygen produced whereas conventional extractors require about 4.4 kilowatt hours. Rough calculations indicate that if the cells of the present invention are used in an efficient manner they will be capable of producing oxygen in a relatively cheap manner and will lead to significant savings in cost in applications where oxygen cylinders are at present employed.

The following Examples illustrate the invention.

The FIGURE shows diagrammatically apparatus for extracting gases from gaseous mixtures in accordance with the invention.

A three compartment cell was constructed as shown in the FIGURE. It will be appreciated that the cell shown was constructed for experimental evaluation of various aspects of the present invention and is not to be considered as typical of a cell to be used commerically.

The cell generally comprises a cathode compartment 1, a catalytic decomposition compartment 2 and an anode compartment 3. The cathode compartment 1 was provided with a floating electrode 4 and, as shown, a Dynamic Hydrogen Reference electrode (DHE) 5 was used to monitor the potential working electrode 4, the tip of the Luggin capillary 6 of the DHE electrode 5 being positioned about 1 mm below the floating electrode 4. If desired, the cathode compartment 1 may be separated from the remainder of the cell by the provision of a No. 4 glass frit 7. 5N KOH solution was used as the electrolyte 8.

A catalytic decomposer 15 was provided in compartment 2.

The anode compartment 3 was provided with a working anode 9 and with a DHE electrode 10. Air was passed into cathode compartment 1 via inlet 11 and the oxygen produced in compartments 2 and 3 was collected by means of outlets 12 and 13, respectively. As shown, outlets 12 and 13 led to a further combined outlet 14.

EXAMPLE 1

In this Example a cell was used having two compartments separated by a No. 4 glass frit and provided with a 8 $cm^2$ PTFE-bonded graphite floating cathode and a 20 $cm^2$ nickel screen anode. Current was passed at the fixed densities shown using a Chemical Electronics Potentiostat (TR 40-3A). The 5N KOH electrolyte (80 ml) was thermostatted at 25° C. and an air pump was used to supply air to the cathode compartment.

After 1 hour, the concentration of $H_2O_2$ in the electrolyte was measured by titration against standard potassium permanganate solution. The self decomposition of $H_2O_2$ in 5N KOH under the same condition (but without passing current) was measured and found to be 0.525 g/liter of $HO_2^-$ per hour. The number of runs is shown in brackets.

Table 1 shows the amounts of $HO_2^-$ produced at different current densities and confirms that the reduction of oxygen on graphite proceeds via the two electron process.

The 74% yield of $HO_2^-$ as compared with theoretical was mainly due to decomposition on the nickel screen anode and losses during pipetting and titration.

TABLE 1

| Current mA | Theoretical gm $HO_2^-$ | Experimental average gm $HO_2^-$ (in 80 ml. electrolyte) | Experimental/ Theoretical % |
|---|---|---|---|
| 200 | 0.1230 | 0.0917 | 74.55 (2) |
| 400 | 0.2460 | 0.1866 | 75.85 (2) |
| 600 | 0.3693 | 0.2675 | 72.40 (2) |
| 800 | 0.4924 | 0.3575 | 72.6 ± 0.02 (4) |

EXAMPLE 2

Various electrode combinations were evaluated using the cell shown in the FIGURE. A Chemical Electronics Potentiometer (TR 40-3A) was used to feed a 400 mA current to the cell for 30 minutes and a gas burette was attached to outlet 14 to measure the amount of oxygen produced (except that the glass frit 7 was omitted).

The PTFE-bonded cathodes were prepared in a conventional manner, the $NiCo_2O_4$/nickel screen catalytic decomposers and the PTFE-bonded $NiCo_2O_4$/nickel screen anodes were prepared as follows:

(a) $NiCo_2O_4$/nickel screen catalytic decomposers. 100 mesh nickel screen were dipped into 2M Ni/Co nitrate solution (Ni:Co=1:2) and the screens were heated in air at 400° C. for 10 hours. The formation of $NiCo_2O_4$ spinel on the surface of the screen was confirmed by X-ray powder diffraction.

(b) PTFE-bonded screen anodes. $NiCo_2O_4$ (prepared by freeze drying) was mixed with GP1-Fluon dispersion (ex ICI). The $NiCo_2O_4$:PTFE ratio was 10:3. The mixture was then painted onto a 100 mesh nickel screen and dried at 100° C. for 1 hour.

The results obtained with the various electrode and catalytic decomposer combinations are shown in Table 2.

It will be seen that the best results were obtained when operating in accordance with the present invention (cells A and B) using a PTFE-bonded graphite/-screen cathode and a PTFE-bonded $NiCo_2O_4$/nickel screen anode with a $NiCo_2O_4$/nickel screen catalytic decomposer.

When no catalytic decomposer was employed (cell C) the power consumption was similar to that with a cell using platinum black as the cathode (cell D). Even though, in cell C, the cathodic reduction of oxygen occurred by a two electron process, the eroxide ions diffusing to the anode were not fully decomposed and when the power was switched off gassing continued slowly for a long time on the PTFE-bonded $NiCo_2O_4$ anode surface (which is not so active as the thermally decomposed $NiCo_2O_4$/nickel screen catalytic decomposer). This suggests that when the anode is functioning electrochemically the oxygen bubbles effectively blanket a large part of its surface, making it unavailable for peroxide decomposition.

When a peroxide decomposer was placed between a platinum cathode and the $NiCo_2O_4$ anode (cell E) no improvement was noted. This is not surprising because any $HO_2^-$ ions produced at the platinum cathode would be decomposed there, yielding oxygen for further cathodic reduction.

It will be seen that in all cases the power consumption was significantly lower than for a conventional water electrolyser (cell F) and that cell B, constructed in accordance with the present invention, gives significantly better results than the previously proposed cell (cell G) using a platinum black anode and cathode.

Finally, it will be noted that in the experimental cells A and B, not all the peroxyl ions produced were decomposed. This is mainly because of the large distance between the anode and cathode and significant improvements in peroxide conversion can be obtained by decreasing the anode/cathode gap.

TABLE 2

| | | | | | Extraction of oxygen from air (400 mA passed through cell for 30 min) | | | |
|---|---|---|---|---|---|---|---|---|
| | | | | | Theoretical | | | Power |
| Cell No. | Temp. | Cathode | $H_2O_2$ decomposer | Anode | From $H_2O_2$ decomposition ml (NTP) | From $O_2$ evolution ml (NTP) | Experimental ml (NTP) | Voltage iR free volt | consumption KW hr/1000 liters of $O_2$ |
| A | 25° C. | 4 cm² Teflon bonded graphite on nickel screen | 4 cm² $NiCo_2O_4$ on nickel screen | 4 cm² Teflon bonded $NiCo_2O_4$ on nickel screen ($O_2$ evolving) | 45.60 | 45.60 | 78.03 ± 3.18(5) | 1.34 | 3.46 |
| B | 40° C. | 40 cm² Teflon bonded graphite on nickel screen | 4 cm² $NiCo_2O_4$ on nickel screen | 4 cm² Teflon bonded $NiCo_2O_4$ on nickel screen $O_2$ evolving) | " | " | 77.04 ± 3.02 (4) | 1.04 | 2.69 |
| C | 25° C. | 4 cm² Teflon bonded graphite on nickel | none | 4 cm² Teflon bonded $NiCo_2O_4$ | " | " | 49.82 ± 1.11(3) | 1.34 | 5.41 |

TABLE 2-continued

Extraction of oxygen from air (400 mA passed through cell for 30 min)

| Cell No. | Temp. | Cathode | H$_2$O$_2$ decomposer | Anode | Theoretical From H$_2$O$_2$ decomposition ml (NTP) | Theoretical From O$_2$ evolution ml (NTP) | Experimental ml (NTP) | Voltage iR free volt | Power consumption KW hr/1000 liters of O$_2$ |
|---|---|---|---|---|---|---|---|---|---|
| D | 25° C. | 4 cm$^2$ Teflon bonded Platinum black on Pt screen (O$_2$ reduction) | none | 4 cm$^2$ Teflon bonded NiCo$_2$O$_4$ on nickel screen O$_2$ evolving | N/A | 45.60 | 46.96 ± 0.68(5) | 1.26 | 5.36 |
| E | 25° C. | 4 cm$^2$ Ion bonded platinum black on Pt screen O$_2$ reduction) | 4 cm$^2$ NiCo$_2$O$_4$ on nickel screen | 4 cm$^2$ Teflon bonded NiCo$_2$O$_4$ on nickel screen O$_2$ evolving | N/A | 45.60 | 47.77 | 1.26 | 5.26 |
| F | 25° C. | 4 cm$^2$ Teflon Pt black on Pt screen (H$_2$ evolving) | none | 4 cm$^2$ Teflon bonded NiCo$_2$O$_4$ on nickel screen O$_2$ evolving) | N/A | " | 45.80 | 2.09 | 9.12 |
| G | 40° C. | Teflon bonded Pt electrode (O$_2$ reduction | none | Teflon bonded Pt electrode O$_2$ evolving) | N/A | 45.60 | 45.60 | 1.0 | 4.38 |

EXAMPLE 3

The catalytic activity of NiCo$_2$O$_4$ are CoFe$_2$O$_4$ catalytic decomposers was measured by a conventional gasometric technique.

In all cases the reaction rate constant was found to be independent of the initial H$_2$O$_2$ concentration but directly proportional to the catalyst mass, indicating first order Kinetics.

Experiments were conducted at 25° C., 30° C., 35° C. and 40° C. By plotting the first order reaction rate constant against the reciprocal of the temperature (degree kelvin) the activation energy for the decomposition of H$_2$O$_2$ over freeze dried NiCo$_2$O$_4$ (surface area 69.7 m$^2$/g) was calculated as 10.98 Kcal/mole, similar to the value of 10.60 Kcal/mole obtained for CoFe$_2$O$_4$ (prepared by coprecipitation of cobalt and ion hydroxides followed by dehydroxylation at 100° C.) having a surface area of 120 m$^2$/g.

Taking differences in surface area in account this shows the activity of NiCo$_2$O$_4$ to be approximately equivalent to that of CoFe$_2$O$_4$. However, NiCo$_2$O$_4$ is easier to prepare and apply to a screen and is thus currently preferred for use in the present invention.

It will be apparent from the above description that the present invention is especially advantageous in that it provides an oxygen generator which is highly efficient, which has a lower power consumption than hitherto proposed cells and which can be constructed from relatively cheap materials. It will be understood, however, that the electrochemical/chemical process described is not limited to such an application and other applications, modifications and variations falling within the scope of the present invention will be apparent to those skilled in the art.

We claim:

1. A method in which an electrochemical cell is used to separate a gas from a gaseous mixture by reduction of said gas at the cathode and regeneration of said gas at the anode, characterised in that one or more substances formed in the cathodic reduction and/or the anodic regeneration is chemically converted to produce said gas and in that the gas formed by both the anodic regeneration and the chemical conversion is recovered as the product.

2. A method as claimed in claim 1, wherein the substance formed is chemically converted to said gas by catalytic decomposition.

3. A method as claimed in claim 2, wherein the catalyst is provided in solution or dispersion in the electrolyte.

4. A method as claimed in claim 2, wherein the catalyst is provided in the form of a solid member.

5. A method as claimed in claim 4, wherein the catalyst is absorbed or coated on a solid support.

6. A method as claimed in claim 5, wherein the solid support is porous or perforated.

7. A method as claimed in claim 2, wherein the catalyst is provided externally of the cathode compartment of the cell.

8. A method as claimed in claim 1, wherein said gas is oxygen and said gaseous mixture is ambient air.

9. A method as claimed in claim 8, wherein the oxygen in the air is cathodically reduced to produce peroxyl ions which are then catalytically decomposed to produce oxygen product.

10. A method as claimed in claim 9, wherein the cathode is made from a high surface area graphite powder.

11. A method as claimed in claim 10, wherein the powder has a surface area in the range of from 500 to 600 m$^2$/g.

12. A method as claimed in claim 10, wherein the cathode is made from said graphite powder by bonding with polytetrafluoroethylene.

13. A method as claimed in claim 9, wherein the peroxyl ions are catalytically decomposed using a $CoFe_2O_4$ or $NiCo_2O_4$ catalyst.

14. A method as claimed in claim 13, wherein the $CoFe_2O_4$ or $NiCo_2O_4$ is coated on a nickel screen.

15. A method as claimed in claim 9, wherein the catalyst is a spinel oxide or silver.

16. A method as claimed in claim 8, wherein the anode is made from lithiated nickel oxide or $NiCo_2O_4$ by bonding with polytetrafluoroethylene.

17. A method as claimed in claim 8, including an electrolyte present in the electrochemical cell, the electrolyte being an aqueous solution of an alkali metal hydroxide.

18. A method as claimed in claim 17, wherein the alkali metal hydroxide is potassium hydroxide.

* * * * *